Patented Dec. 10, 1929

1,739,151

UNITED STATES PATENT OFFICE

JONAS P. JOHNSON, OF SAN FRANCISCO, CALIFORNIA

METHOD OF FIRING TILES

No Drawing.   Application filed March 5, 1928.   Serial No. 259,383.

This invention relates to the manufacture of clay products, especially clay tile such as floor and wall tile generally, and the object of the invention is to provide a method of firing such tile in the kiln whereby the losses due to cracking and warping of the tiles is overcome.

In the common practice of firing or burning tiles they are usually placed in saggers in the kilns and the heat gradually raised over a period of time extending to a couple of days, depending on the size of the kiln, then maintained at the proper firing temperature for some hours, and the temperature lowered, the fire extinguished, and after cooling sufficiently the kiln is opened and the product removed.

However, it is found that a large percentage of the fired clay bodies are warped or cracked, and this is so even when the greatest of care has been used to avoid too rapid a change of temperature in heating and cooling.

Such loss being considered unavoidable simply had to be charged against general manufacturing expense, and some of the damaged product sold as seconds.

I have discovered a method of almost entirely overcoming the loss through warpage and cracking in the kiln which comprises completely covering the clay goods before firing with a powdered material able to withstand the firing heat, such for instance as any refractory sand, kieselguhr, or other powdered or granular material inert with relation to the clay bodies being fired.

Some clays of which tiles are made fire at a much lower temperature than others and consequently permit the use of sand which would fuse and stick to clays of higher firing temperatures.

In carrying out my process I preferably place the tiles on edge in saggers in the kiln in the usual way, but fill the saggers with sand of proper refractory nature so that the tiles are entirely covered, and preferably the spaces between the tiles, if standing on edge are also filled. When the kiln is filled I fire it in the usual manner.

The method described, results in substantially eliminating losses through warpage or cracking and produces a very evenly fired body.

While I find the greatest value of my invention in connection with the firing of flat tiles, it is evident that it has value in the firing of any kind of clay bodies where the danger of warping and cracking is incurred.

I claim:

The method of reducing the tendency of clay tiles to warp and crack in firing which comprises arranging the tiles on edge in saggers and spaced from each other, and resting all along their lower edges on the bottom thereof, filling the spaces between the tiles and entirely covering the tiles with a granular material refractory to the firing heat, and of firing the tiles in a kiln while so covered.

JONAS P. JOHNSON.